(12) United States Patent
Ferris et al.

(10) Patent No.: US 8,370,829 B2
(45) Date of Patent: Feb. 5, 2013

(54) POST-INSTALL CONFIGURATION FOR APPLICATIONS

(75) Inventors: James M. Ferris, Cary, NC (US); David P. Huff, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1154 days.

(21) Appl. No.: 11/848,815

(22) Filed: Aug. 31, 2007

(65) Prior Publication Data

US 2009/0064131 A1 Mar. 5, 2009

(51) Int. Cl.
G06F 9/445 (2006.01)
G06F 9/44 (2006.01)

(52) U.S. Cl. .......................... 717/174; 717/121; 717/175

(58) Field of Classification Search .......... 717/174–176, 717/121
See application file for complete search history.

(56) References Cited

U.S. PATENT DOCUMENTS

| | | | |
|---|---|---|---|
| 5,450,545 A | 9/1995 | Martin et al. | |
| 5,555,416 A * | 9/1996 | Owens et al. | 717/178 |
| 6,161,176 A * | 12/2000 | Hunter et al. | 713/1 |
| 6,239,800 B1 | 5/2001 | Mayhew et al. | |
| 6,282,711 B1 | 8/2001 | Halpern et al. | |
| 6,718,366 B2 | 4/2004 | Beck et al. | |
| 6,744,450 B1 | 6/2004 | Zimniewicz et al. | |
| 6,910,072 B2 | 6/2005 | Beck et al. | |
| 6,973,647 B2 * | 12/2005 | Crudele et al. | 717/177 |
| 7,594,225 B2 | 9/2009 | Barr et al. | |
| 7,805,676 B2 | 9/2010 | Schemers et al. | |
| 2002/0013833 A1 * | 1/2002 | Wyatt et al. | 709/220 |
| 2003/0043178 A1 | 3/2003 | Gusler et al. | |
| 2003/0088616 A1 | 5/2003 | Etessami et al. | |
| 2004/0083206 A1 | 4/2004 | Wu et al. | |
| 2004/0250247 A1 | 12/2004 | Deeths et al. | |
| 2005/0108703 A1 | 5/2005 | Heller | |
| 2005/0125788 A1 | 6/2005 | Lupini et al. | |
| 2005/0262501 A1 * | 11/2005 | Marinelli et al. | 717/174 |
| 2006/0010345 A1 | 1/2006 | Schnoebelen et al. | |
| 2006/0039547 A1 | 2/2006 | Klein et al. | |
| 2006/0123409 A1 * | 6/2006 | Jordan et al. | 717/174 |
| 2006/0123410 A1 * | 6/2006 | Kapoor | 717/174 |
| 2006/0253849 A1 * | 11/2006 | Avram et al. | 717/172 |
| 2006/0265706 A1 * | 11/2006 | Isaacson et al. | 717/174 |
| 2007/0083610 A1 * | 4/2007 | Treder et al. | 709/217 |
| 2007/0106984 A1 | 5/2007 | Olsen et al. | |
| 2007/0271552 A1 | 11/2007 | Pulley | |
| 2008/0127171 A1 * | 5/2008 | Tarassov | 717/174 |
| 2008/0127175 A1 * | 5/2008 | Naranjo et al. | 717/174 |
| 2008/0155534 A1 | 6/2008 | Boss et al. | |
| 2008/0307413 A1 | 12/2008 | Ferris | |
| 2008/0320468 A1 | 12/2008 | Ferris | |
| 2009/0064131 A1 | 3/2009 | Ferris | |
| 2009/0144700 A1 | 6/2009 | Huff | |

* cited by examiner

Primary Examiner — Anna Deng

(74) Attorney, Agent, or Firm — Lowenstein Sandler LLP

(57) ABSTRACT

Embodiments of the present teachings provide for standardized post installation configuration of a software application. For Linux-based applications, a portal service provides a Red Hat Packet Manager ("RPM") package that includes selected software to be installed on a user's computing device, and a post install configuration file ("PIC"). A post-install configurator accesses the PIC file and performs post-installation configuration based on the contents of the PIC file. The PIC file thus provides a standardized mechanism in which software vendors can specify post-installation configuration of their applications, without having to develop their own tools or applications.

18 Claims, 4 Drawing Sheets

POST-INSTALL CONFIGURATION FOR APPLICATIONS

FIELD

The present invention relates to application and configuration. More particularly, the embodiments of the present invention relate to providing an efficient mechanism and process for standardizing post-installation configuration of applications.

BACKGROUND

Computers and computer applications have become a way of life for the majority of society. Although most computers come pre-configured with some computer applications, most users must install and/or configure additional computer applications on their computer to tailor their computer for their particular needs. Such computer application installation and/or configuration can be as easy as a one step activation of an installation program. Because of this complex nature, the post install configuration can not be automated without some level of user interaction or knowledge of the prexisting system. However, in order to make an application truly operational, more complex computer applications require a user to perform post-installation configuration of the application.

Unfortunately, post-installation configuration can be difficult. Some post installation configuration decisions require knowledge of an installation parameter and/or a configuration parameter, e.g., parameters of a user's computer hardware, operating system parameters, other computer programs installed on the user's computer, etc. Without a user making the proper post-installation configuration, the installed application may either not execute at all or alternately may not execute in the manner desired.

Typically, if a user has a question with any portion of the installation and post-installation, a user can attempt to look up an answer on the Internet. Knowledgebase assistance is widely available at numerous websites on the Internet. However, to find an answer to a particular post-installation question a user must know what keywords to use in a search field in order to obtain a helpful answer. A user could literally spend hours searching a particular installation question before finding a helpful answer.

Alternately, a user can attempt to call some type of help line or use an instant messaging window to obtain help from a live assistance person. However, calling a help line typically results in having to wait for a help person to answer the call and must hope they get a help person that has the knowledge that they need and can convey it in the manner that will assist the user.

Accordingly, it would be desirable to provide a way for efficiently performing post-installation configuration of applications.

BRIEF DESCRIPTION OF THE DRAWINGS

The accompanying drawings, which are incorporated in and constitute a part of this specification, illustrate embodiments of the teachings and together with the description, serve to explain the principles of the teachings.

DESCRIPTION OF THE EMBODIMENTS

Figure 1:
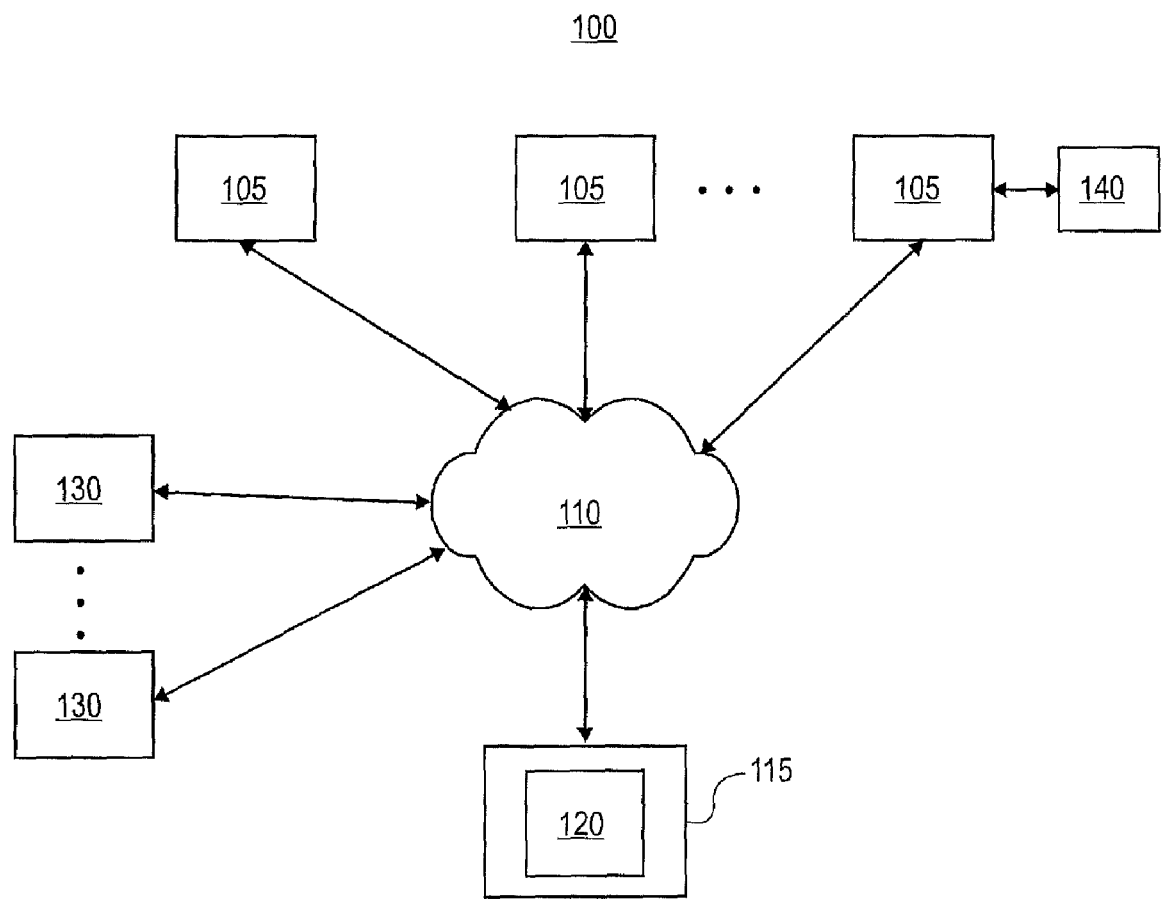
FIG. 1 shows a system that allows a user to communicate with a portal server, in accordance with an embodiment of the present teachings.

For simplicity and illustrative purposes, the principles of the present teachings are described by referring mainly to exemplary embodiments thereof. However, one of ordinary skill in the art would readily recognize that the same principles are equally applicable to, and can be implemented in, all types of networked computer systems, and that any such variations do not depart from the true spirit and scope of the present teachings. Moreover, in the following detailed description, references are made to the accompanying figures, which illustrate specific embodiments. Electrical, mechanical, logical and structural changes may be made to the embodiments without departing from the spirit and scope of the present teachings. The following detailed description is, therefore, not to be taken in a limiting sense and the scope of the present teachings is defined by the appended claims and their equivalents.

Embodiments of the present teachings provide for standardized post installation configuration of a software application. For Linux-based applications, a portal service can provide a Red Hat Package Manager ("RPM") package that includes selected software to be installed on a user's computing device, post-install configurator, and a post install configuration file ("PIC"). The post-install configurator accesses the PIC file and performs post-installation configuration based on the contents of the PIC file. The PIC file thus provides a standardized mechanism in which software vendors can specify post-installation configuration of their applications, without having to develop their own tools or applications.

A post-install configuration ("PIC") tool at a client provides a standardized, application post-install configuration of a software application after it has been installed. The PIC tool is integrated into the RPM package and can parse information in the PIC file and prompt a user for configuration information. The user provided information is then used to perform the post install configuration. Since it is integrated into the RPM package, the PIC tool can be placed in a known predefined location during installation and initiated once the software has been installed. The PIC tool can have an interface, such as a graphical user interface (GUI) and a text user interface (TUI). The PIC tool may also be able to query a remote server or service for additional information and can be accessed remotely by the portal service, if needed.

An independent software vendor ("ISV") can provide the parameters for the PIC file to be placed on the portal service. The ISV can use a web browser or other similar graphical user interface (GUI) to interact with the portal service. In some embodiments, the PIC file is in a standardized format, such as an extensible markup language (XML) file that the ISV uses to specify post-installation configuration.

Reference will now be made in detail to the present embodiments, examples of which are illustrated in the accompanying drawings. Wherever possible, the same reference numbers will be used throughout the drawings to refer to the same or like parts.

FIG. 1 shows a system 100 that allows a user to communicate with a portal server 115, in accordance with an embodiment of the present invention. It should be readily apparent to those of ordinary skill in the art that the system 100 shown in FIG. 1 represents a generalized system illustration and that other components can be added or existing components can be removed or modified while still remaining within the spirit and scope of the present teachings. As shown in FIG. 1, the system 100 includes users 105, a network 110, a portal server 115, and ISVs 130. These components of FIG. 1 will now be briefly described.

The users 105 can be an individual user, a small business owner, a user within a business or governmental entity, etc. The users 105 can interact with the portal server 115 using computing platforms such as laptops, personal computers, workstations, servers, or other similar devices.

The users 105 can interface with the portal server 115 through the network 110 via a network connection (not shown). Users 105 can access the portal server 115 to retrieve software application(s) that they desire to install on their computing device. A user 105 can access the portal server 115 via known Internet communication protocols, e.g., Transmission Control Protocol/Internet Protocol (TCP/IP), using known Internet addressing schemes. The network connection can be a private network (e.g., a business network, an educational network, etc.), an Internet service provider or other similar interfaces means. The network 110 can be a combination of local, wide area networks as well as private or public networks or combinations thereof. In some embodiments, the Internet can be used as the network 110.

A user 105 computing device can also include a PIC tool 140 that can provide a common interface with other software application configurations. The PIC tool 140 can configure a software application after it has been installed. The PIC tool 140 can parse the information in the PIC and prompt a user 105 for information Additionally the PIC tool 140 can poll a portal server 115 to retrieve updated or recommended settings and information. The information provided by the user 105 can be used to perform the post install configuration.

Since the PIC tool 140 can be integrated into a RPM package, it's installation and location of the PIC file may be standardized and automated. The PIC tool 140 can then be initiated once the PIC file is placed in a predefined location on the user 105 computing device. The PIC tool 140 can have both a GUI and text user interface (TUI) or application programming interface (API) for interfacing from third party applications. As noted, because the PIC can be distributed from a central location, i.e., portal server 115, the user 105 can be provided with a standardized, post-installation configuration GUI or TUI that is not ISV 130 dependent.

The portal server 115 can be implemented with a variety of servers from manufacturers such as DELL. HEWLETT-PACKARD, TRANSMETA, SUN MICROSYSTEMS, etc. as known to those skilled in the art. The portal server 115 can store and execute a multi-user operating system such as RED HAT Linux 5.xx, WINDOWS Enterprise, UNIX-HP, or other operating systems known to those skilled in the art. Similar to the users 105, the portal server 115 can interface with the network 110 via a network interface such as private network, a T1 connection or other similar high throughput network interface.

The portal server 115 can store a plurality of software applications that a user 105 can install on their computing device(s) that can be transferred to a user 105 along with a software application to ease configuration of the software application.

The portal server can include an installation and configuration assistant ("ICA") module 120 that are accessible by the ISVs to add, delete, or modify the PIC files of their applications (as described in more detail below). The ICA module 120 can be configured to provide an ISV with a list of their software applications that are available on the portal server 115.

In some embodiments, the PIC file can be an extensible markup language (XML) file or similar language that can describe what the software application requires to direct execution of a processor. The PIC file can describe what is prompted to a user 105, buffering any user supplied information and the processing the user 105 supplied information. The PIC file can also be specific for each software application. For example, it is often common to specify items, such as the time zone, passwords, user accounts, etc., during post-installation. The PIC file may thus comprise the parameters for specifying these items.

The ICA module 120 can be further configured to query a user 105 to input the parameters of the computer system of the user 105, i.e., a computing environment. For example, the ICA module 120 can generate a configuration GUI that allows a user to input parameters such as operation system type and version, central processing unit, amount of memory, installed applications, number of disk drives, number of users, security requirements, etc.

ISVs 130 may interface with the portal server 115 through the network 110 via a network connection (not shown). The network connection can be a private network (e.g., a business network, an educational network, etc.), an Internet service provider or other similar interfaces means. The network 110 can be a combination of local, wide area networks as well as private or public networks or combinations thereof. In some embodiments, the Internet can be used as the network 110.

Figure 2:
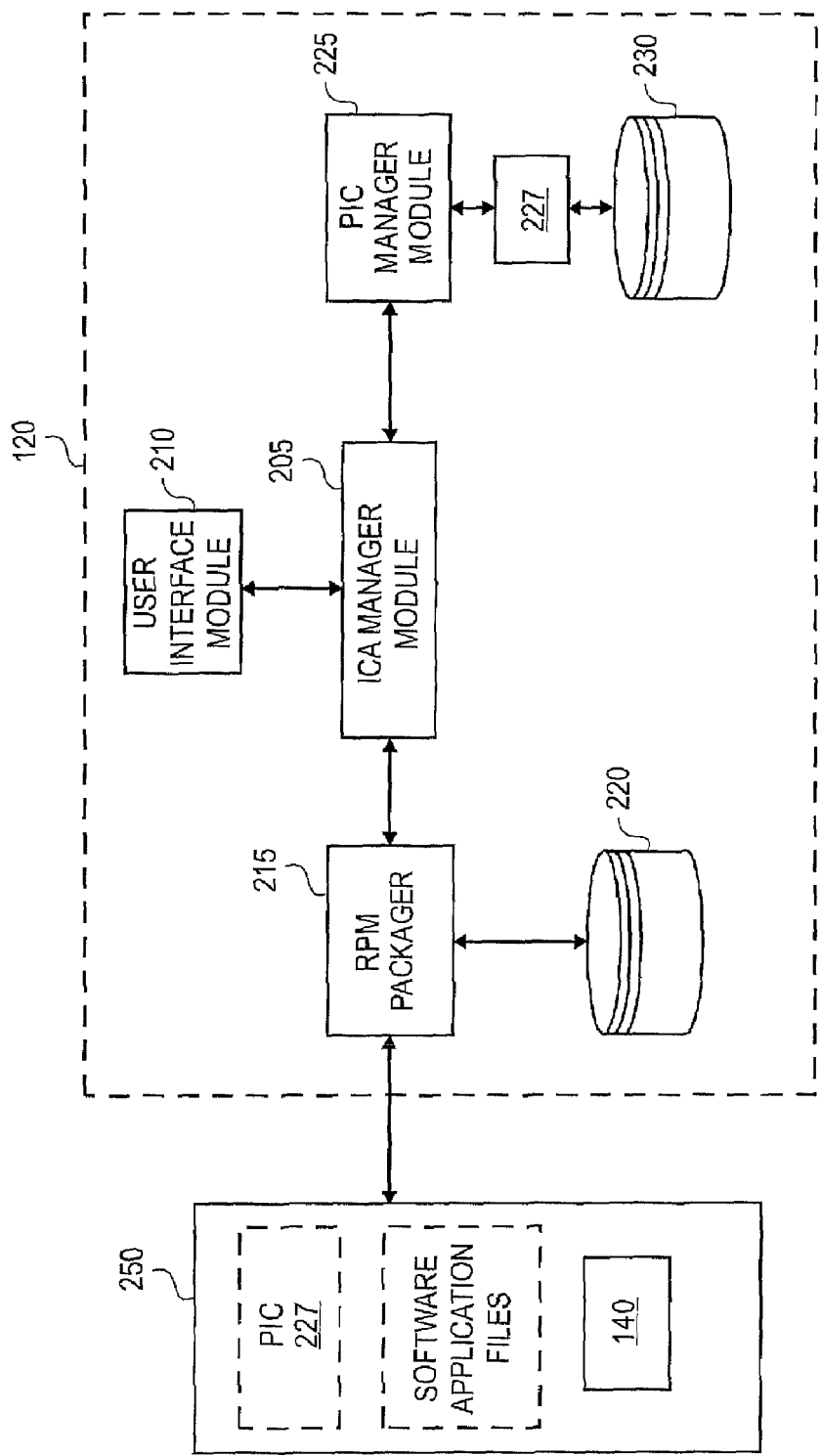
FIG. 2 shows a more detailed block diagram of the installation and configuration assistant module from FIG. 1, in accordance with another embodiment of the present teachings.

FIG. 2 shows a more detailed block diagram of the ICA module 120 from FIG. 1, in accordance with another embodiment of the present teachings. It should be readily apparent to those of ordinary skill in the art that the ICA module 120 shown in FIG. 2 represents a generalized system illustration and that other components can be added or existing components can be removed or modified while still remaining within the spirit and scope of the present teachings.

As shown in FIG. 2, the ICA module 120 can comprise an ICA manager module 205, a user interface module 210, a RPM packager 215, a RPM package database module 220, a PIC manager module 225, and a PIC database module 230. These components of ICA module 120 will now be further described.

The ICA manager module 205 can be configured to manage modules 210-230 to coordinate the internal functionality of the ICA module 120. In some contexts, the ICA manager module 205 can be considered the main thread or routine that manages the data flow and processing sequences of data flowing throughout the ICA module 120.

The ICA manager module 205 can interface with the user interface module 210. The user interface module 210 can be configured to generate GUIs to retrieve information from a user 105 as well as provide the user 105 a mechanism for receiving information. The user interface module 210 can be configured to generate GUIs to retrieve information from a user 105 as well as provide the user 105 a mechanism for receiving information. The GUIs of the user interface module 210 can be written in, e.g., HTML, XML, Java, etc., as is known to those skilled in the art.

The RPM packager 215 can be configured to accept the selections of software application(s) from the user interface module 210 through the ICA manager module 205. The RPM packager 215 can retrieve the selected applications from the RPM database 220.

The RPM packager 215 can also be configured to receive a PIC 227 from the PIC manager module 225 and package the selected applications and the PIC 227 as an RPM package 250.

The PIC manager module 225 can retrieve the PIC(s) 227 from the PIC database module 230. More particularly, the user 105 software application selection(s) can be passed to the PIC manager module 225 from the user ICA manager 205. The PIC manager module 225 can formulate a database query with the user 105 software application selection(s). The PIC manager module 225 can issue the formulated database query to the PIC database module 230. The PIC database module 230 can pass a PIC(s) 227 that corresponds to the formulated database query back to the PIC manager manager 225. The PIC manager module 225 can then pass the PIC(s) 227 to the PIC manager module 225.

In some embodiments, the RPM package database module 220 can also store prerequisite software application(s) that may be required by the selected software application(s). Thus, the RPM packager 215 can automatically retrieve prerequisite software application(s) and package the RPM package 250 that not only conventionally includes software application files, but additionally includes prerequisite software application(s) and the PIC(s) 227 retrieved from the PIC database 230 as well as PIC tool 140. For example, a user selecting the ZIMBRA™ Collaboration Suite can automatically receive the MYSQL software application and PIC(s) 227 associated with the ZIMBRA™ Collaboration Suite and the MYSQL software application.

Once the system-specific RPM package 250 is packaged, the ICA manager module 205 can direct the user interface module 210 to generate a results GUI that provides a link for the user 105 to download the system-specific RPM package 250 to a user 105 as a RPM package. Alternately, the RPM package 250 can be a separate file from the PIC(s) 227 that a user 105 can download individually, and then executed individually to perform their respective installation and post-installation configuration.

The PIC database module 230 can be populated by the ISVs 130 using a web browser or other similar graphical user interface (GUI) widget to interact with the portal server 115. The ISVs 130 can interact with the user interface module 210 to establish a desire to populate the PIC database module 230. Their desire can be conveyed through an ISV GUI provided by the user interface module 210. The ISV GUI can provide a menu selection to allow the ISVs 130 to pass their created PIC(s) 227 to the PIC database module 230. The user interface module 210 can receive the ISV 130 PIC(s) 227 and transfer the PIC(s) 227 to the ICA manager 205. The ICA manager 205 can transfer the ISV 130 PIC 227 to the PIC manager 225 which can store the ISV 130 PIC(s) 227 on the PIC database 230.

An ISV 130 can use a developer tool to create the PIC 227 that populates the PIC database 230. The developer tool can have knowledge of what other software applications that exist on the portal service, what services those software applications provide and how to package them into a PIC. The developer tool may thus assist an ISV 130 in developing a PIC 227 for their software application.

Figure 3:
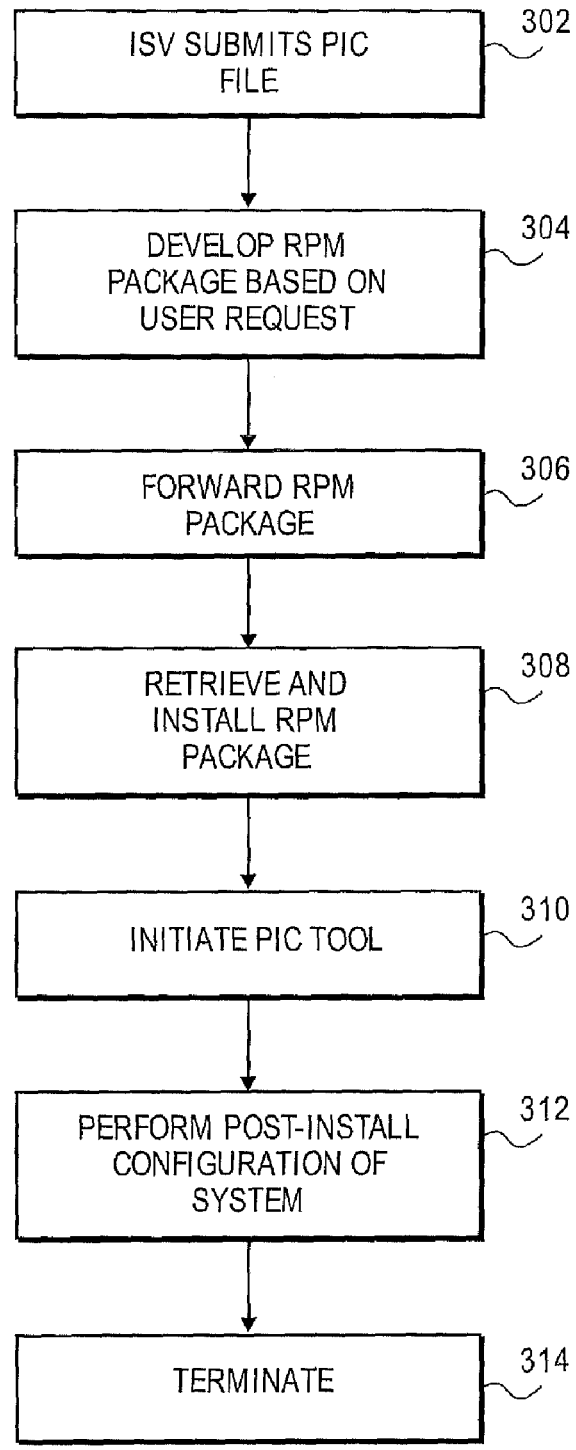
FIG. 3 shows a flow diagram for the steps that can be performed by the installation and configuration assistant, in accordance with another embodiment of the present teachings.

FIG. 3 shows a flow diagram 300 for post-installation configuration in accordance with the present invention. It should be readily apparent to those of ordinary skill in the art that the flow diagram 300 shown in FIG. 3 represents a generalized flow diagram illustration and that other steps can be added or existing steps can be removed or modified while still remaining within the spirit and scope of the present teachings.

In step 302, an ISV submits a PIC file to the ICA manager module 205. In some embodiments, the ISV may be required to authenticate to the portal server 115 to gain access. Once the ISV has been authenticated, the ICA manager module 205 can invoke the user interface module 210 to display a standard interface to the ISV. Through this interface, an ISV can be directed the PIC manager 225 to retrieve their appropriate PIC file(s) 227 from the PIC database 230 for editing, etc., or may be permitted to add or delete PIC file(s) from the PIC database 230 as desired.

In step 304, upon request by a user (such as user 105) the RPM packager 215 can be configured to package the software application(s), a PIC tool 140, and a PIC file 227 into a RPM package 250. Next, in step 306, RPM packager 215 can pass the RPM package 250 to the ICA manager module 205. The ICA manager module 205 may then make the RPM package 250 available to the user 105 for download. The user 105 can then choose to download the RPM package 250 at their convenience. Alternatively, the RPM package 250 can be placed on a portable storage medium such as compact disc, tape, flash drive or other similar persistent storage device.

In step 308, at the system of user 105, the RPM package 250 is downloaded and installed. The RPM package 250 may be installed over a network or from a medium, such as a compact disc, flash drive, and the like. As noted, within RPM package 250, the PIC tool 140 and PIC files 227 are integrated as part of the RPM package. Thus, as part of the installation process of the software application(s), the PIC tool 140 and PIC files 227 are also installed at a standardized directory location. This information may be specified, for example, in what are known as a RPM "kickstart" file.

In step 310, after installation, the PIC tool 140 is started. The PIC tool can be initiated automatically or user-directed, i.e., manually. Upon startup, the PIC tool 140 may perform various checks, such as whether all of the prerequisite software has been installed, and identifies the operating environment of the software application(s).

In step 312, the PIC tool 140 performs post-installation configuration of the software application(s). In particular, the PIC tool 140 may be configured to find and locate the PIC files 227 on the system of user 105. PIC tool 140 may then read PIC files 227 and use this information to perform the post-installation configuration.

For example, the PIC tool 140 may specify basic items, such as the time zone to be used by the software application, create a default account, create one or more user accounts, configure network connections of the software application(s), etc. Of course, during post-install configuration, PIC tool 140 may interactively prompt user 105 for various feedback or parameters. Alternatively, the PIC tool 140 may pull configuration settings and options from the Portal server. Those skilled in the art will recognize that any sort of post-installation configuration may be performed by the PIC tool 140 and using PIC files 227.

In step 314, the PIC tool 140 concludes its post-install configuration of the application and shuts down. Optionally, the PIC tool 140 may then startup the software application or ask user 105 for a response.

Of note, since the PIC tool 140 and PIC files 227 are integrated as part of a RPM package, this allows these items to be managed by the Linux RPM command. Thus, it allows user 105 to add and remove PIC tool 140 and PIC files 227, query for version information, and check their dependencies and integrity. This feature allows post-install configuration to leverage the benefits of the RPM packaging and RPM functions of the Linux operating system.

The various modules disclosed herein can be implemented in hardware, in software, or a combination of hardware and software. Implementation in hardware or a combination of hardware and software would have the various modules communicating with over a data interface, e.g., a universal serial bus, a Peripheral Component Interconnect ("PCI") interface, a Firewire interface, etc.

Figure 4:
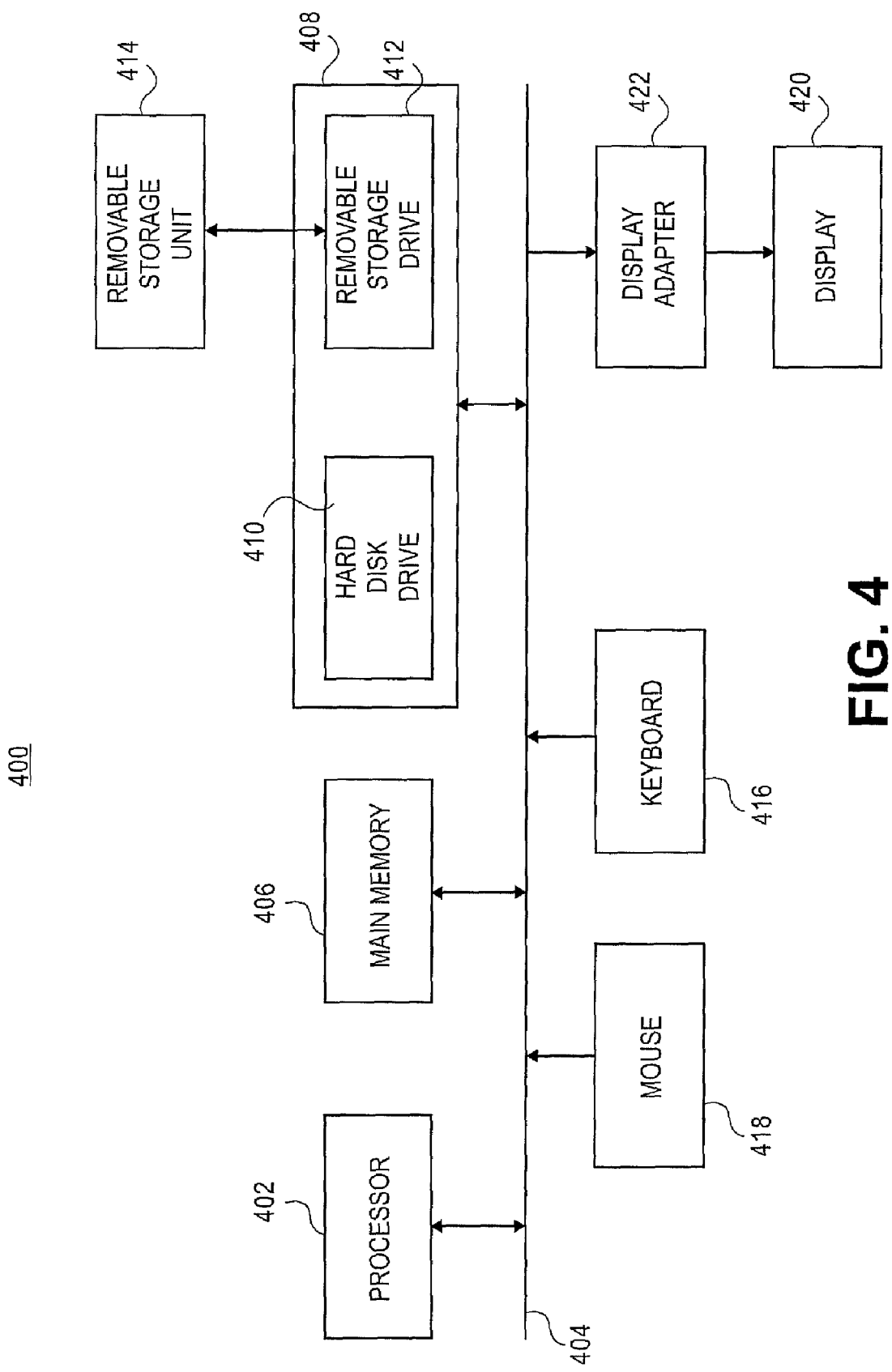
FIG. 4 shows a computer system that can be used with the installation and configuration assistant, in accordance with another embodiment of the present teachings.

FIG. 4 shows a computer system that can be used by user 105 to install and perform post-install configuration, in accordance with another embodiment of the present teachings.

As shown in FIG. 4, the computer system 400 includes one or more processors, such as processor 402 that provide an execution platform for embodiments of the present invention. Commands and data from the processor 402 are communicated over a communication bus 404. The computer system 400 also includes a main memory 406, such as a Random Access Memory (RAM), where the ICA module 120 may be executed during runtime, and a secondary memory 408. The secondary memory 408 can include, for example, a hard disk drive 410 and/or a removable storage drive 412, representing a floppy diskette drive, a magnetic tape drive, a compact disk drive, etc. The removable storage drive 412 can read from and/or writes to a removable storage unit 414 in a well-known manner. A user interfaces with the security client and certificate management system with a keyboard 416, a mouse 418, and a display 420. A display adapter 422 interfaces with the communication bus 404 and the display 420. The display adapter also receives display data from the processor 402 and converts the display data into display commands for the display 420.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been illustrated with respect to one or more implementations, alterations and/or modifications can be made to the illustrated examples without departing from the spirit and scope of the appended claims. In addition, while a particular feature of the teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising."

Other embodiments of the teachings will be apparent to those skilled in the art from consideration of the specification and practice of the teachings disclosed herein. It is intended that the specification and examples be considered as exemplary only, with a true scope and spirit of the teachings being indicated by the following claims.

What is claimed is:

1. A method comprising:
   installing, on a user computing device, a package comprising a software application, a prerequisite software application associated with the software application, a post-install configuration file and a post-install configurator application; and
   executing, using a hardware processor of the user computing device, the post-install configurator application, wherein executing the post-install configurator application comprises:
   installing the prerequisite software application associated with the software application,
   retrieving first configuration information from the post-install configuration file, wherein the first configuration information comprises a description of the post-install configuration,
   retrieving second configuration information from a remote server, wherein the second configuration information comprises parameters, provided by an independent software vendor (ISV), for the post-install configuration file,
   retrieving third configuration information from a user via a user interface, wherein the third configuration comprises information associated with the user computing device, and
   configuring the software application using the first configuration information, the second configuration information, and the third configuration information.

2. The method according to claim 1, wherein installing the package comprises saving the post-install configurator application and the post-install configuration file to a predefined location.

3. The method according to claim 1, wherein executing the post-install configurator application comprises checking for the prerequisite software application associated with the software application.

4. The method according to claim 1, wherein installing the package comprises installing the package from a compact disc.

5. The method according to claim 1, wherein installing the package comprises installing the package from a flash drive.

6. The method according to claim 1, wherein installing the package comprises installing the package over a network.

7. The method of claim 1, wherein executing the post-install configurator application further comprises:
   generating a graphical user interface and a textual user interface; and
   performing a check for the prerequisite software application and to identify an operating system.

8. The method of claim 7, further comprising:
   prompting the user through the graphical user interface or the textual user interface for parameters, wherein the parameters comprise at least one of a time zone, a password, a user account, an operating system type, an operating system version, a memory amount or one or more security requirements.

9. The method of claim 7, further comprising:
prompting the user through the graphical user interface or the textual user interface to select a software application;
retrieving the software application selected by the user; and
generating an updated package from the post-install configuration file and the selected software application.

10. An apparatus comprising a processor and a computer program comprising program instructions in executable source code, that when executed by the processor, cause the processor to:
install, on user computing device, a package comprising a software application, a prerequisite software application associated with the software application, a post-install configuration file, and a post-install configurator application; and
execute the post-install configurator application, wherein executing the post-install configurator application comprises further program instructions in executable source code, that when executed by the processor, cause the processor to:
install the prerequisite software application associated with the software application,
retrieve first configuration information from the post-install configuration file, wherein the first configuration information comprises a description of the post-install configuration,
retrieve second configuration information from a remote server, wherein the second configuration information comprises parameters, provided by an independent software vendor (ISV), for the post-install configuration file,
retrieve third configuration information from a user via a user interface, wherein the third configuration information comprises information associated with the user computing device, and
configure the software application using the first configuration information, the second configuration information, and the third configuration information.

11. A computer system comprising:
a storage device configured to store a package comprising a software application, a prerequisite software application associated with the software application, a post-install configurator application, and a post-install configuration file; and
a processor configured to:
install the package; and
execute the post-install configurator application, after the package has been installed, wherein executing the post-install configurator application causes the processor to:
install the prerequisite software application associated with the software application;
retrieve first configuration information from the post-install configuration file, wherein the first configuration information comprises a description of the post-install configuration;
retrieve second configuration information from a remote server, wherein the second configuration information comprises parameters, provided by an independent software vendor (ISV), for the post-install configuration file;
retrieve third configuration information from a user via a user interface, wherein the third configuration information comprises information associated with the user computing device; and
configure the software application using the first configuration information, the second configuration information, and the third configuration information.

12. The system according to claim 11, wherein the processor is configured to save the post-install configurator application and the post-install configuration file to a predefined location in the storage.

13. The system according to claim 11, wherein the processor is configured to check for the prerequisite software application associated with the software application upon executing the post-install configurator.

14. A non-transitory computer readable medium programmed to cause a processor to perform a method for installing a package on a user computing device, the package comprising:
a software application,
a prerequisite software application associated with the software application,
a post-install configuration file, and
a post-installation configurator application, wherein the post-install configurator application is configured to:
install the prerequisite software application associated with the software application,
retrieve first configuration information from the post-install configuration file, wherein the first configuration information comprises a description of the post-install configuration,
retrieve second configuration information from a remote server, wherein the second configuration information comprises parameters, provided by an independent software vendor (ISV), for the post-install configuration file,
retrieve third configuration information from a user via a user interface, wherein the third configuration information comprises information associated with the user computing device, and
configure the software application using the first configuration information, the second configuration information, and the third configuration information.

15. The non-transitory computer readable medium according to claim 14, wherein the package comprises program code for saving the post-install configurator application and the post-install configuration file to a predefined location.

16. The non-transitory computer readable medium according to claim 14, wherein the program code for the post-install configurator application comprises program code for checking for the prerequisite software application associated with the software application.

17. The non-transitory computer readable medium according to claim 14, wherein the medium is a compact disc.

18. The non-transitory computer readable medium according to claim 14, wherein the medium is a flash drive.

* * * * *